Sept. 13, 1955     C. B. FRANCIS     2,717,657
APPARATUS FOR CLEANING GASES
Filed Jan. 8, 1952     6 Sheets-Sheet 2
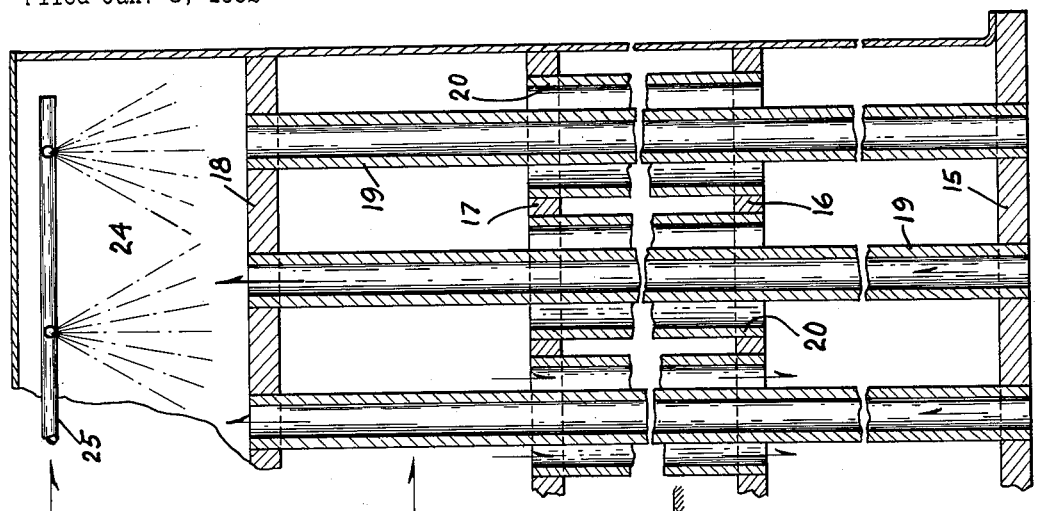
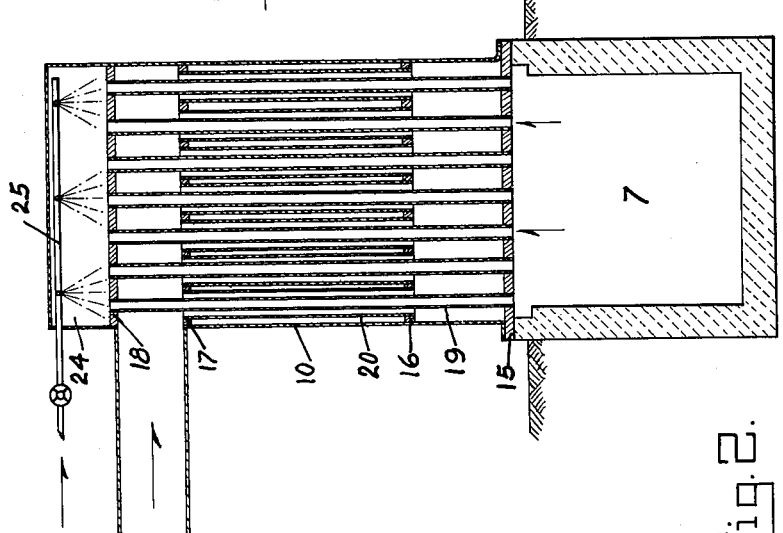
INVENTOR.
CHARLES B. FRANCIS.
BY
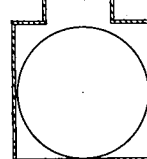
his attorneys Sept. 13, 1955  C. B. FRANCIS  2,717,657
APPARATUS FOR CLEANING GASES
Filed Jan. 8, 1952  6 Sheets-Sheet 3

INVENTOR.
CHARLES B. FRANCIS.
BY Christy, Parmelee and Strickland
his attorneys

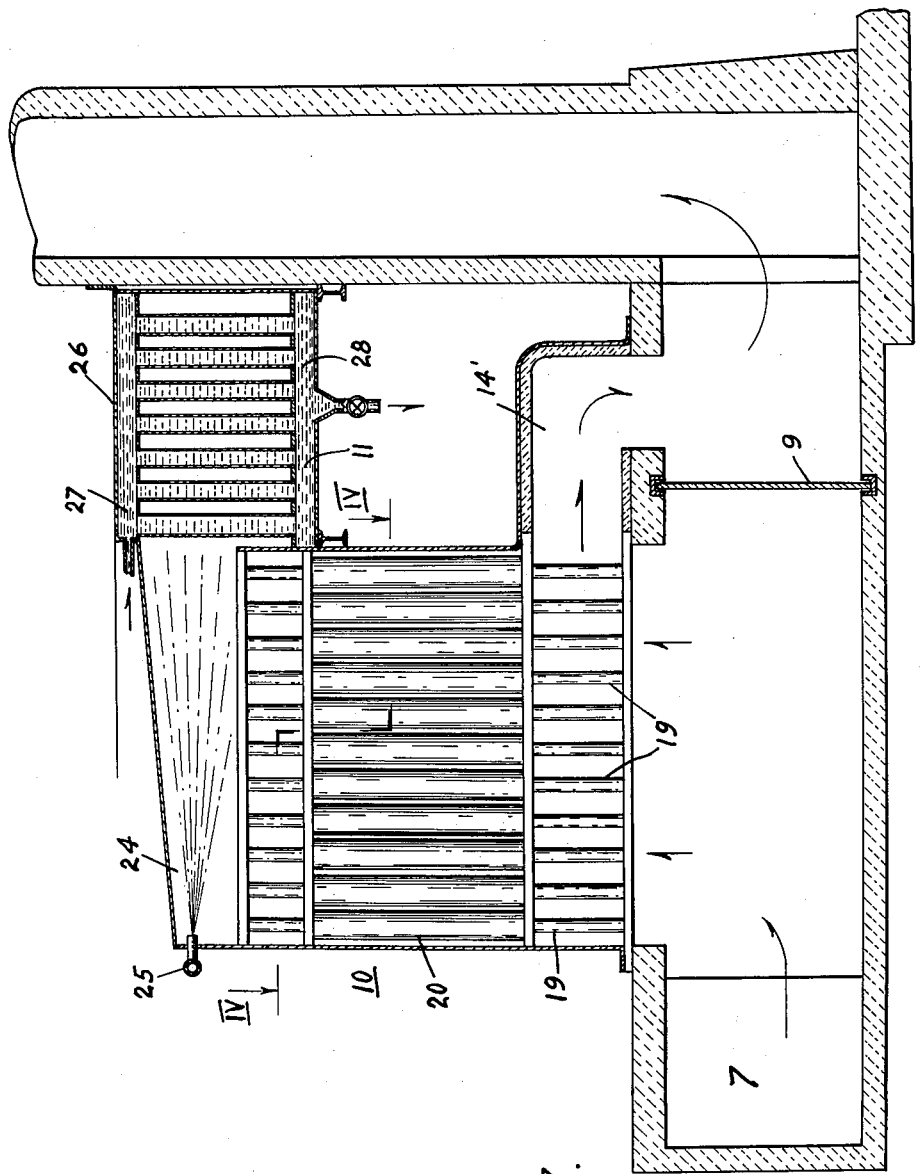

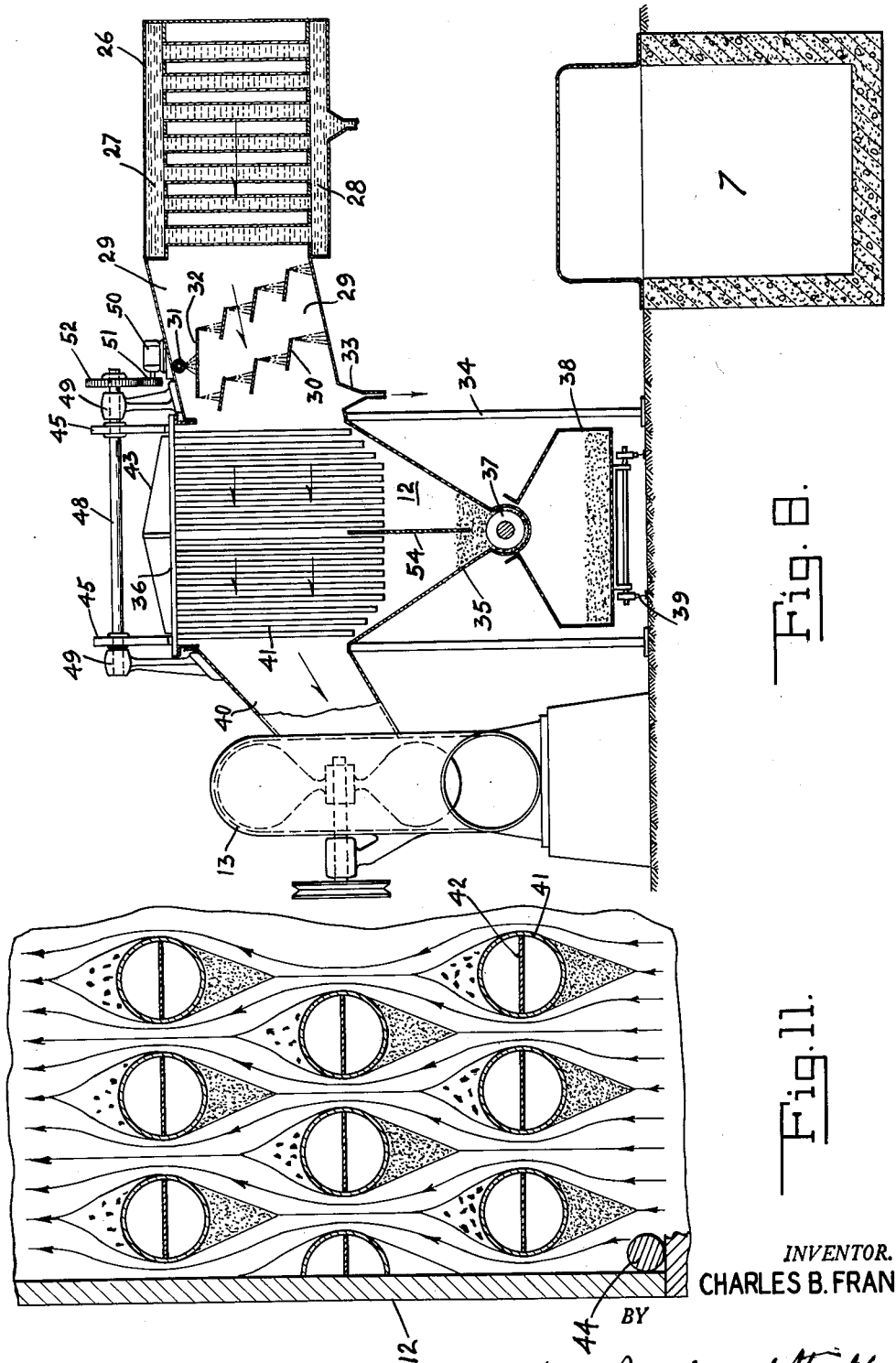

Sept. 13, 1955   C. B. FRANCIS   2,717,657
APPARATUS FOR CLEANING GASES
Filed Jan. 8, 1952   6 Sheets-Sheet 6
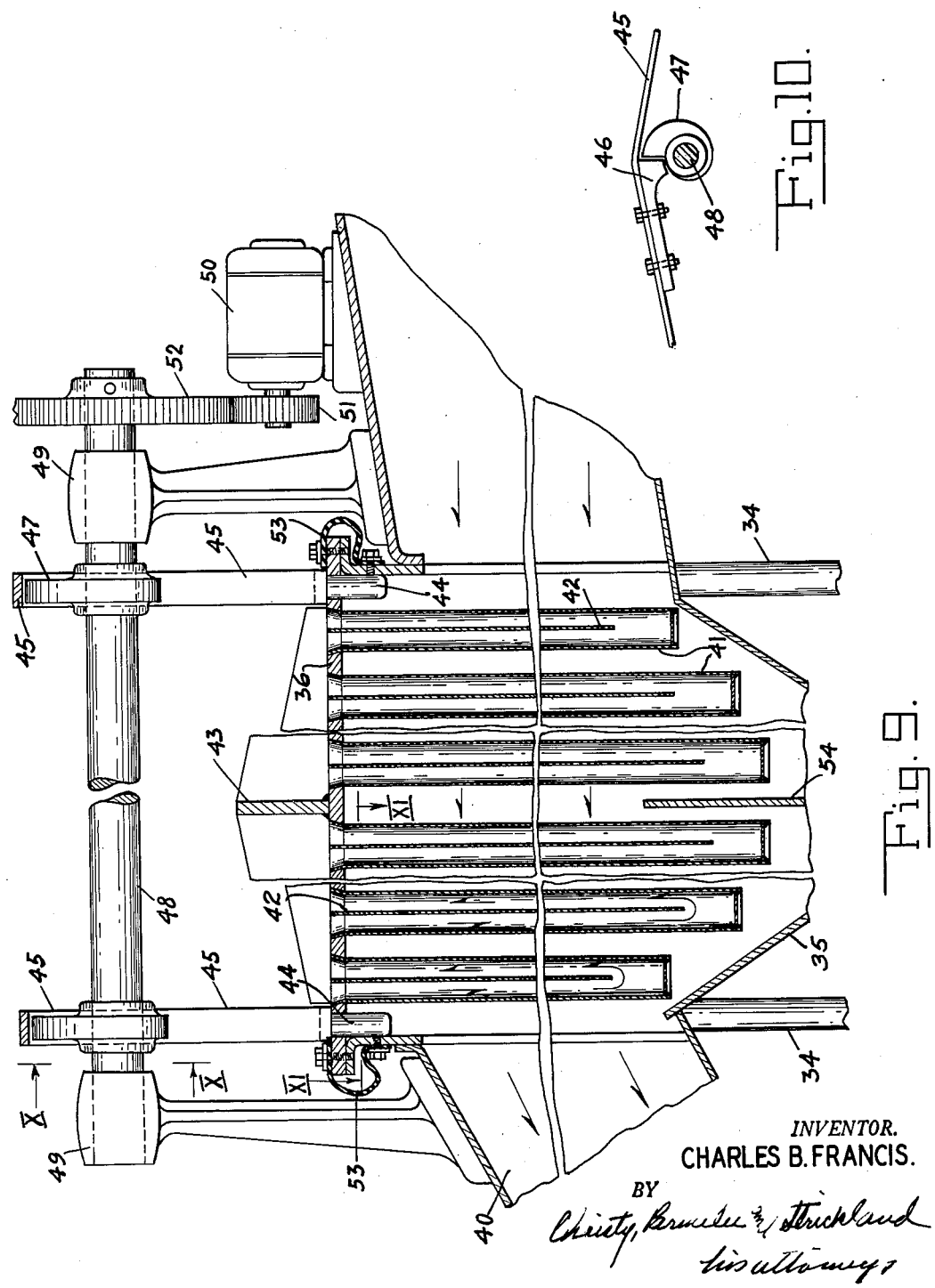
INVENTOR.
CHARLES B. FRANCIS.
BY
*Christy, Parmelee & Strickland*
*his attorneys*

United States Patent Office 2,717,657
Patented Sept. 13, 1955

2,717,657

APPARATUS FOR CLEANING GASES

Charles B. Francis, Pittsburgh, Pa., assignor to Loftus Engineering Corporation, Pittsburgh, Pa., a corporation of Maryland Application January 8, 1952, Serial No. 265,402

10 Claims. (Cl. 183—23)

This invention relates to the cleaning of dust-laden gas and, in particular, to apparatus for removing dust from hot waste gas such as that discharged from open hearth steel furnaces.

The problem of cleaning waste furnace gas presents serious difficulties. While the larger particles of solids leaving the furnace proper are trapped in the various appurtenances such as slag pockets, regenerators and stack flues, the remainder, under 100 microns in size, can be collected and removed by means known previously only at considerable cost and have therefore been discharged from the stack to the annoyance and injury of property owners over a wide surrounding area. Urban communities in which steel works are located, however, are becoming less tolerant of air pollution and this makes the problem more pressing than ever.

The dust particles carried out of the stack at present vary from .05 to 100 microns in size and are mostly metal oxides with physical properties which render separation difficult. The quantity of dust varies from .05 to more than 2 grains per cu. ft. of gas at standard conditions between different heats and even between different stages of the same heat. Thus, the quantity and character of the dust in open hearth waste gas make it unlikely that 100% removal thereof by any commercially feasible method or apparatus will be achieved. It is accordingly the object of my invention to remove from the gas all but a minimum of the smallest particles which will float in air for long periods, and to do this at a low cost. A further object is to provide apparatus for this purpose which is substantially automatic in operation.

I have discovered that, if open hearth waste gas is fogged, by humidifying it and cooling it to 120 deg. F. or lower, and then passed through a bank of tubes extending at right angles to the gas stream, at a velocity of about 30 ft. per second, most of the dust or aerosols carried in suspension by the gas will be deposited on the upstream side of the tubes. The aerosols thus collected will agglomerate to form a moist mass, more or less compact, but not wet enough to form an adherent cake on the tubes, such as would prevent the agglomerate from being easily removed from the tubes by jarring or rapping.

In a preferred practice and embodiment of the invention, I divert waste gas from the stack flue and pass it through a primary heat absorber, a humidifying chamber and a secondary cooling chamber, which progressively cool and fog the gas. A condensation of the water vapor present in the gas is initiated by the dust particles which serve as nuclei. I then pass the gas through a novel collector, or separator, to remove the dust and a part of the condensed water vapor, and then I cause the clean cool gas to absorb heat from the incoming dirty gas. The cleaned gas is thus reheated and returned to the stack flue.

A complete understanding of the invention may be obtained from the following detailed description and explanation, which refer to the accompanying drawings that illustrate the preferred embodiment of the invention.

In the drawings:

Fig. 2 is a transverse section through the stack flue and a heat exchanger as seen on the plane of line II—II in Fig. 1;

Fig. 3 shows a portion of the structure of Fig. 2 to larger scale;

Fig. 7 is a longitudinal section through the stack flue, the heat exchanger, humidifier and a portion of the second cooling or fogging chamber, taken along the plane of line VII—VII of Fig. 1;

Fig. 8 is a transverse section through the second cooling or fogging chamber and the dust collector, the view being taken along the plane of line VIII—VIII of Fig. 1, and showing in elevation a centrifugal blower for circulating the gas;

Fig. 9 is a portion of Fig. 8 to enlarged scale;

Fig. 10 is a partial section on the plane of line IX—IX of Fig. 9; and

Fig. 11 is a partial horizontal section through the collector, taken along the plane XI—XI of Fig. 9.

Figure 1:
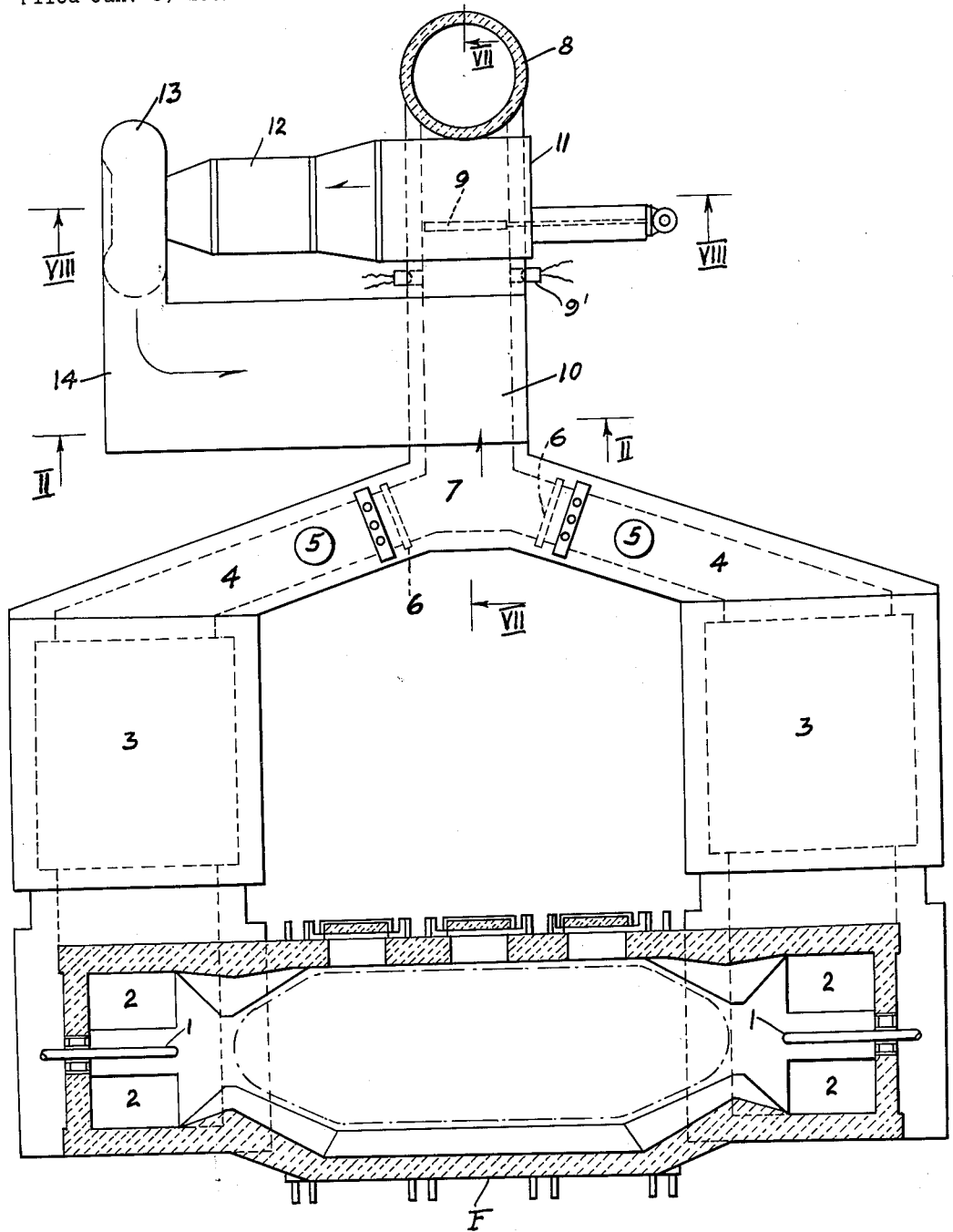
Fig. 1 is a diagrammatic plan view of an open hearth furnace installation in which the invention has been incorporated, certain parts of the installation being shown in horizontal section.
Figures 4, 5, 6:
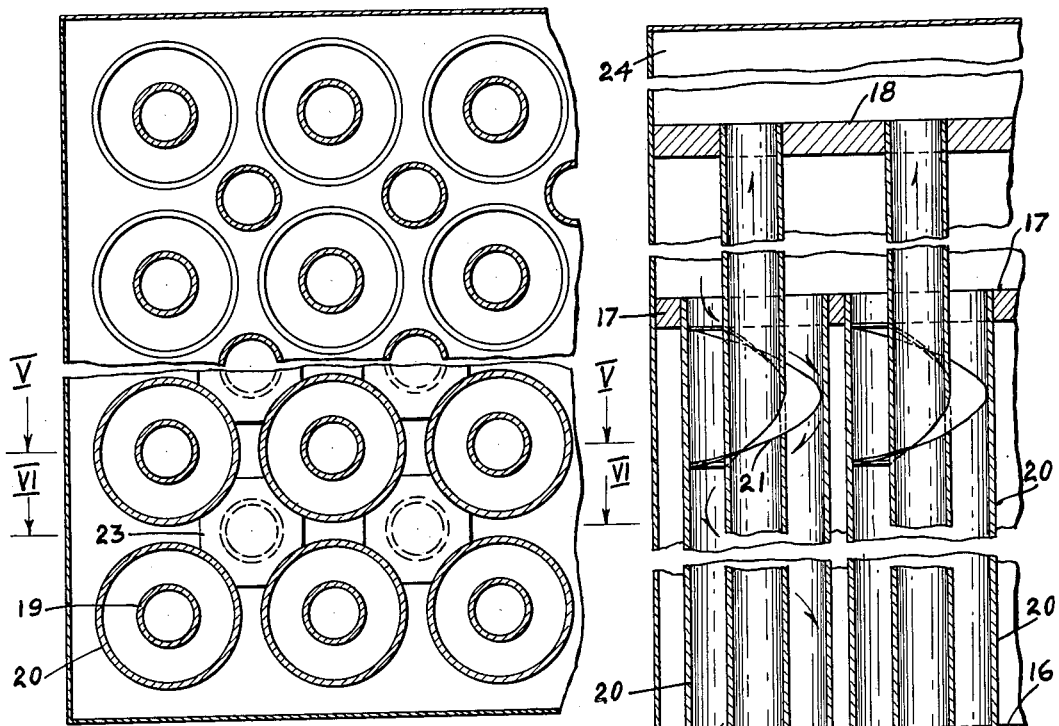
Fig. 4 is a partial horizontal section through the heat exchanger, as seen on the plane of line IV—IV of Fig. 7.
Figs. 5 and 6 are partial vertical sections through the heat exchanger taken along the planes of lines V—V and VI—VI, respectively, of Fig. 4.

Referring now in detail to the drawings and, for the present to Fig. 1, the open hearth furnace F there shown includes in addition to the usual hearth, walls and roof, the burners 1, vertical passages 2 serving alternately as uptakes for preheated air and downtakes for waste gas, regenerator checker chambers 3 and breeching flues 4. The flues, leading to a stack flue 7, are provided with air inlet valves 5 and reversing valves 6. Flue 7 connects with stack 8 and has a horizontally slidable damper 9 therein. This damper is slid back and forth by a motor driven rack and pinion not shown. The electric motor is actuated by a special circuit arranged so that it may be operated either manually or through a relay to an electric eye 9', by means of which the damper is closed only when the solid particles suspended in the gas in flue 7 exceed a certain maximum or permissible amount, as will be understood upon reference to my copending patent application Serial No. 165,709, filed June 2, 1950, now Patent No. 2,609,063, granted September 2, 1952.

The gas-treating and dust removal apparatus which I have invented comprises generally a heat absorber, or exchanger, and humidifier 10, a secondary heat absorber, or cooling and fogging chamber 11, a dust collector 12, a motor driven blower 13 wired to operate only when damper 9 is closed, and ducts 14 and 14' leading to and from the heat exchanger (see Figs. 1, 2, 7 and 8). Each of these units and its function and operation will now be described in turn.

*Heat exchanger and humidifier (Figs. 2–7)*

The heat exchanger and humidifier indicated generally at 10 is of the tube type and comprises a housing fabricated from steel plate, provided with vertically spaced tube sheets 15, 16, 17 and 18. Sheet 15 which forms the bottom of the housing and spans flue 7 should be of heat-resistant alloy and braced against sagging. Hot-gas tubes 19 extend between sheets 15 and 18. Cold-gas tubes 20 surrounding tubes 19 extend between sheets 16 and 17. Helical vanes 21 are disposed between tubes 19 and 20 adjacent the upper ends of the latter (see Fig. 5). Additional hot-gas tubes 22 staggered relative to tubes 19 (see Figs. 4 and 6) extend between sheets 15 and 16 and similar tubes 22' between sheets 17 and 18. Hot gas thus circulates around the exterior of tubes 20 as well as being conducted therethrough by tubes 19. Baffles 23 are mounted on tubes 20 at a level spaced above the upper ends of tubes 22 to insure good contact with the former of the gas flowing from the latter.

Furnace gas previously cleaned and cooled enters the absorber or exchanger between sheets 17 and 18 from duct 14 and flows downwardly through tubes 20. Damper 9 being closed, hot gas from flue 7 ascends through tubes 19 and also enters the space surrounding tubes 20 between sheets 16 and 17, through tubes 22. The hot gas is thus cooled, and the cold gas is heated to temperatures corresponding to the heat exchange. The cold gas after reheating returns to flue 7 beyond damper 9 through duct 14' and is then discharged to the atmosphere by stack 8. For protection, duct 14' should be lined with a light refractory.

The gas flowing out of tubes 19 and 22', after being cooled initially, enters a humidifying chamber 24 above sheet 18, provided with a water-spray pipe 25. Sprays from this pipe further cool the gas and effectively humidify it.

*Secondary cooling and fogging chamber (Figs. 7 and 8)*

Chamber 24 communicates at one side with an indirect or tube-type cooler 26 built into chamber 11. This cooler or heat absorber comprises an upper water box 27 and a lower water box 28 connected by spaced vertical tubes. Gas flowing around the tubes is further cooled to or within a few degrees above its dewpoint by water circulating through the cooler as shown by arrows. Such cooling permits cleaning the tubes with air jets.

A direct cooler 29 forming part of the fogging chamber is disposed between cooler 26 and dust collector 12. It has a plurality of inclined trays or shelves 30 effective to produce a series of cascades when water falls thereon from a header pipe 31 and a distributor plate 32. Gas passing through cooler 29 is further cooled to the extent that a part of the water vapor in the gas is condensed on the nuclei afforded by dust particles entrained with the gases. Excess water drains from cooler 29 through a trough 33 in the bottom thereof.

*Dust collector (Figs. 8–11)*

The dust collector 12 comprises a rectangular chamber fabricated from metal plate, supported on posts 34, having a hopper bottom 35 and a tube plate or cover 36 resting loosely thereon (see Fig. 8). The bottom has a screw conveyor 37 therein which discharges at one end into a car 38 traveling on rails 39. The collector chamber opens on one side into cooler 29 and on the other into a duct 40 connected to the eye of blower 13. Tube plate 36 is drilled to receive the open upper ends of a multiplicity of collector tubes 41 closed at the bottom and fitted with longitudinal partition strips 42. The tubes are arranged in rows, the tubes of adjacent rows being staggered (see Fig. 11). The tubes may be of corrosion-resistant metal, synthetic plastic such as polyethylene or nylon, or fibrous sheet material such as paper suitably impregnated to make it water resistant up to the boiling point of water. The windward sides of the tubes may be roughened to increase the adherence of aerosols. The tube plate has stiffening webs 43 welded thereto and is provided with guide pins 44 at the corners, fitting snugly in the four corners of the chamber.

Yokes 45 at opposite sides of the tube plate have cam blocks 46 thereon (see Fig. 10) for cooperation with cams 47 on a shaft 48 extending across the plate and journaled in bearings 49. The shaft is driven by a motor 50 through a pinion 51 and gear 52. The motor and adjacent bearing 49 are mounted on cooler 29 and the other bearing on duct 40. Operation of the motor causes the tube plate to be raised slightly by cams 47 and then dropped suddenly, thereby dislodging any accumulations of dust built up on the tubes. A flexible sealing strip 53 secured to the tube plate and the walls of the collector chamber and extending around the periphery thereof prevents escape of gas and dust when the tube plate is raised. A baffle plate 54 extending across the chamber above conveyor 37 prevents the gas flowing through the chamber from by-passing the tube bank.

The cold clean gas from collector 12 is returned by blower 13 to heat exchanger 10 through duct 14, and thus serves to cool hot gas simultaneously entering the treating system from flue 7.

The following is a brief description of operation of the above disclosed apparatus.

With damper 9 closed, dust-laden gas from the flue 7, at from 1100 to 1400 deg. F. and containing from 28 to 32% water vapor, flows from flue 7 upwardly through heat exchanger 10 and is cooled therein, by cold gas which has already been treated, to a temperature between 500 deg. and 600 deg. F. The partly cooled gas then enters the humidifier where it is sprayed with sufficient water to cool it further to from 225 deg. to 250 deg. F. The spray water is vaporized, increasing the water vapor content to from 36 to 44%. Preferably the water input is controlled by a thermostat responsive to the temperature of the gas leaving the humidifier so as to maintain it in the neighborhood of 220 deg. F. The gas is further cooled in cooler 11 to about 160 deg., at which temperature the gas is saturated by a water vapor content of about 29%, and condensation fogging is therefore initiated, since the actual content is greater.

At this stage, about 10% of the vapor takes the form of very small fog droplets and part of the condensed moisture is absorbed by the aerosols. The gas is further fogged by passing through the direct cooler 29 which lowers the temperature to about 120 deg. F. at which the gas is saturated with only 11.5% vapor. Thus the fog droplets become larger and the surfaces of the aerosols become moist. The water cascading down through cooler 29 collects some dirt, and most of the acidic gases may be absorbed by keeping the water alkaline. The aerosols still remaining suspended in the gas are by now in such condition as to facilitate their collection and removal in collector 12.

As the moving stream of gas approaches the bank of tubes 41, a small portion may pass between the tubes of the first row without contact therewith. The remainder, however, will be deflected (see Fig. 11) and the change of direction causes the aerosols to come in contact with the tubes and adhere to the windward side thereof because of their moist condition. At velocities below about 10 F. P. S., the impact is insufficient to cause adherence of the aerosols. At velocities above about 50 F. P. S., the aerosols are swept off the tubes as fast as they make contact therewith. The small portion of the gas which passes the first row of tubes undeflected is deflected by the tubes of the second row because of the staggered relation of the tubes in successive rows. Thereafter, the numerous subdivisions of the main gas stream are repeatedly deflected, first one way and then the other, being reunited and again split, on passing between succeeding rows of tubes. As the subdivisions pass between tubes, their velocity is temporarily increased. On reaching the space between rows, the velocity is reduced, but the aerosols tend to continue traveling in a straight line at a higher speed than that of the surrounding gas. Thus they are deposited on a tube in the next row. Only the smallest and lightest particles are able to thread the maze of tubes, so that an effective cleaning operation results. It may be noted that Fig. 11 shows fragmentarily the first three banks or rows of tubes adjacent to the entrance to the collector 12, and, while the drawing shows substantially equal quantities of dust particles collected on the tubes of each row in practice the first bank of tubes will accumulate more dust than the second row, and the second row more than the third row, and so on. Upon reaching the fifth or sixth row of tubes in the collector the greater part of the aerosols will have been removed from the gas. Therefore, very little if any dust will be found adhering to the last row of tubes at the end of the usual collecting period.

Motor 50 is operated for a few seconds at short intervals, as by automatic timer mechanism, to cause rapping of the tubes 41 as the tube plate is raised and then suddenly dropped by action of cams 47. The agglomerated particles deposited on the tubes are dislodged, fall into the hopper and are collected in the conveyor 37. The space on the leeward side of each tube is characterized by a quiescent condition. Consequently agglomerated particles swept from the windward side tend to settle down through this space to the hopper bottom of the collector. Thus, it will be seen that the dust collector 12 is effective as an agglomerator and a separator, as well as a collector.

The baffle strips 42 perform an important function. As fog is formed in the gas, the heat of vaporization contained by the water vapor is liberated and absorbed by the gas, tending to raise the temperature of the latter and decrease the amount of fog formed. This is prevented by atmospheric cooling of the tubes through the open upper ends thereof. Circulation of cooling air downwardly into the tubes and upwardly therefrom is aided by the strips 42 which define separate channels for the up and down drafts.

While the invention has been disclosed herein as applied particularly to the cleaning of waste gases from an open hearth furnace, it may also be applied to other installations where gas carries solid particles in suspension. The removal of fly ash from boiler-house stack gases is one example. Such solids when removed and collected, are in the form of a moist powder which can be transported in open dump cars or trucks and used for fill or other purposes.

It will be apparent from the foregoing that the invention provides a simple, effective and low-cost apparatus for cleaning large volumes of hot gas containing substantial amounts of fine suspended solids. Aerosols larger than about .1 micron are practically entirely removed, leaving only the smaller particles which are subject to Brownian movement and are generally present in small amounts. The apparatus can be made largely automatic, thereby reducing the operating cost, and insuring optimum conditions for cleaning, at all times. The hot gases to be cleaned are cooled by heat exchange with the gases previously cooled, so that the overall amount of cooling required is relatively small. Also, the clean gases are heated in the same heat exchanger through which the hot gases pass, thus developing a stack draft that decreases the load on the blower to that required to force the gases through the apparatus. Again, by driving the blower with a variable speed motor the draft on the furnace may be regulated and controlled much better than by the conventional method of adjusting the stack damper. Many other advantages will be apparent to those skilled in the art of operating furnaces emitting dust ladened waste gases. For example, the hot gases from such a furnace may be first drawn through a waste heat boiler, lowering their temperature to about 650 deg. F., then cleaned by the method and with the apparatus described with the clean waste gases being discharged to the stack at about 250 deg. F.

Although I have disclosed herein only a preferred embodiment and practice of the invention, I intend to cover as well any modification thereof within the spirit of the invention and the scope of the appended claims.

I claim:

1. Gas-cleaning apparatus comprising a heat exchanger through which the gas first passes, a humidifier connected in series with said exchanger, a heat absorber connected in series with said humidifier and effective to cool the gas below the dew point, a collector chamber connected in series with said absorber including top plate borne by the walls of said chamber and supporting a bank of accumulator tubes transverse to the gas stream and means for periodically dislodging solid particles accumulated on said tubes.

2. The apparatus defined by claim 1 characterized by said last-mentioned means including means for slightly lifting the top tube-supporting plate and dropping it to supported positions on said walls.

3. Apparatus for cleaning waste furnace gas comprising a heat exchanger including a housing having a bank of tubes enclosed therein, said housing spanning a waste-gas flue, a humidifier above said bank, a dust collector, a heat absorber connected between the humidifier and the collector effective to reduce the gas temperature below the dew point, said collector including a bank of accumulator tubes transverse to the gas flow, and means for periodically jarring the tubes to dislodge particles accumulated thereon.

4. The apparatus defined by claim 3 characterized by said last-mentioned means including means for lifting the collector tube bank slightly and dropping it.

5. The apparatus defined by claim 3 characterized by said absorber including a first section having a tube bank and a second section having a series of vertically spaced trays forming descending cascades of cooling water.

6. The apparatus defined by claim 3 characterized by a return duct from said collector to siad heat exchanger whereby the cleaned cool gas absorbs heat from the gas entering the heat exchanger from the flue.

7. Apparatus for cleaning gas comprising a gas-to-gas heat exchanger and a heat absorber including an indirect heat exchanger and a direct cooler wherein said direct cooler comprises vertically spaced shelves and water-supply means thereabove to provide a series of cascades descending over said shelves, a humidifier connected between said heat exchanger and absorber, a dust collector connected to the absorber including a bank of spaced accumulator tubes transverse to the gas flow, and means for periodically dislodging from the tubes the solid particles accumulated thereon.

8. Apparatus for cleaning gas comprising a gas-to-gas heat exchanger and a heat absorber, a humidifier connected between said heat exchanger and absorber, a dust collector connected to the absorber including a bank of spaced accumulator tubes transverse to the gas flow, a connection from said collector to said heat exchanger whereby the cooled clean gas is arranged to absorb heat from the entering gas, and means for periodically dislodging from the tubes the solid paritcles accumulated thereon.

9. In apparatus for cleaning the dusty hot gases of industrial furnaces and the like, which apparatus comprises means for humidifying and cooling the hot gases to produce a fog in which the dust particles in the gases form the nuclei of the fog particles, and a dust collector connected to receive such fogged gases, said dust collector comprising a bank of spaced accumulator tubes supported in positions extending transversely of the general direction of flow of the fogged gases; the invention herein described which comprises the combination with such apparatus of mechanism for powerfully vibrating said tubes from time to time whereby to dislodge accumulations of collected dust particles therefrom.

10. In apparatus for cleaning the dusty hot gases of industrial furnaces and the like, which apparatus comprises a dust system including heat-exchange means for receiving and cooling the gases delivered by the furnace, means for humidifying the gases flowing from the heat-exchange means, means for cooling the humidified gases to produce a fog in which the dust particles in the gases form the nuclei of the fog particles, and a dust collector comprising a bank of spaced accumulator tubes supported in positions transversely of the general direction of flow of the fogged gases; the invention herein described which comprises the combination with such apparatus of mechanism for powerfully vibrating said tubes from time to time whereby to dislodge accumulations of collected dust particles therefrom.

References Cited in the file of this patent

UNITED STATES PATENTS

| Number | Name | Date |
|---|---|---|
| 248,354 | Schmandt | Oct. 18, 1881 |
| 972,534 | Hickey | Oct. 11, 1910 |
| 997,762 | Derrig | July 11, 1911 |
| 1,165,351 | Wedge | Dec. 21, 1915 |
| 1,212,199 | Eustis | Jan. 16, 1917 |
| 1,366,712 | Brendle et al. | Jan. 25, 1921 |
| 1,481,970 | Welch | Jan. 29, 1924 |
| 1,779,282 | Louis | Oct. 21, 1930 |
| 1,782,435 | Merriam | Nov. 25, 1930 |
| 1,821,860 | Werner et al. | Sept. 1, 1931 |
| 1,912,381 | Merlon | June 6, 1933 |
| 1,940,199 | Wagner | Dec. 19, 1933 |
| 2,242,294 | Fox | May 20, 1941 |
| 2,458,756 | Watson | Jan. 11, 1949 |

FOREIGN PATENTS

| Number | Country | Date |
|---|---|---|
| 266,603 | Germany | Oct. 28, 1913 |
| 556,179 | Germany | July 14, 1932 |